(12) United States Patent
Wadsworth (10) Patent No.: US 9,003,624 B2
(45) Date of Patent: Apr. 14, 2015

(54) METHOD FOR MAKING A GANGABLE COMPOSITE CLIP FOR ATTACHING DECKING

(71) Applicant: Kevin Wadsworth, Greenwood, IN (US)

(72) Inventor: Kevin Wadsworth, Greenwood, IN (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 0 days.

(21) Appl. No.: 13/999,255

(22) Filed: Feb. 3, 2014

(65) Prior Publication Data

US 2014/0186109 A1   Jul. 3, 2014

Related U.S. Application Data

(63) Continuation-in-part of application No. 12/592,495, filed on Nov. 25, 2009.

(51) Int. Cl.
| | |
|---|---|
| B21D 53/00 | (2006.01) |
| F16B 5/00 | (2006.01) |
| F16B 5/06 | (2006.01) |
| B21D 53/36 | (2006.01) |
| E04F 15/02 | (2006.01) |
| B29C 39/10 | (2006.01) |

(52) U.S. Cl.
CPC ............... *F16B 5/002* (2013.01); *F16B 5/0607* (2013.01); *B21D 53/36* (2013.01); *B29C 39/10* (2013.01); *E04F 15/02* (2013.01); *E04F 2201/023* (2013.01); *Y10S 411/903* (2013.01)

(58) Field of Classification Search
CPC ........ B21D 53/36; B29C 39/10; F16B 5/0607
USPC ........ 29/413, 414, 527.1, 527.2; 403/12, 186, 403/294, 387, 388, 188; 52/177, 489.1, 52/586.2, 650.3, 480; 411/903, 542; 264/260, 273, 274
See application file for complete search history.

(56) References Cited

U.S. PATENT DOCUMENTS

| | | | |
|---|---|---|---|
| 3,293,106 A | 12/1966 | Cocco et al. | 428/137 |
| 3,458,618 A | 7/1969 | Burns et al. | 264/249 |
| 3,845,860 A | 11/1974 | Ladouceur et al. | 206/338 |
| 3,899,116 A | 8/1975 | Mims | 228/110.1 |
| 3,973,151 A | 8/1976 | Bowcott | 310/216.086 |
| 4,106,962 A | 8/1978 | Adams et al. | 156/73.1 |
| 4,736,507 A | 4/1988 | Berecz et al. | 29/243.53 |
| 5,250,058 A | 10/1993 | Miller et al. | 606/154 |
| 5,351,392 A | 10/1994 | Wing et al. | 29/818 |
| 5,499,440 A | 3/1996 | Satoh et al. | 29/512 |
| 5,746,535 A | 5/1998 | Kohler | 403/258 |
| 6,298,533 B1 | 10/2001 | Nishimura et al. | 29/243.5 |
| 6,314,699 B1 | 11/2001 | West | 52/489.1 |
| 6,402,415 B1 | 6/2002 | Eberle, III | 403/231 |
| 6,440,525 B1 | 8/2002 | Kessler et al. | 428/99 |
| 6,470,641 B1 | 10/2002 | Faure | 52/480 |

(Continued)

*Primary Examiner* — Jermie Cozart
(74) *Attorney, Agent, or Firm* — Shartsis Friese LLP (57) ABSTRACT

A gangable composite clip for attaching decking. The clip includes a bottom and a top. The bottom is made of a first material. The top is made of a second material. The first material of the bottom is different than the second material of the top. The first material of the bottom engages in the second material of the top during manufacturing so as to attach the bottom to the top and form the gangable composite clip without a need for any other means to attach the bottom to the top.

17 Claims, 8 Drawing Sheets

(56) References Cited

U.S. PATENT DOCUMENTS

| | | | |
|---|---|---|---|
| 6,651,398 B2 | 11/2003 | Gregori | 52/489.1 |
| 6,711,864 B2 | 3/2004 | Erwin | 52/582.1 |
| 6,851,884 B2 | 2/2005 | Eberle | 403/231 |
| 6,871,467 B2 | 3/2005 | Hafner | 52/586.1 |
| 7,052,200 B2 | 5/2006 | Harris | 403/231 |
| 7,383,663 B2 | 6/2008 | Pacione | 52/120 |
| 7,409,803 B2 | 8/2008 | Grohman | 52/489.1 |
| 7,465,905 B2 | 12/2008 | Braun | 219/265 |
| 7,984,599 B2 | 7/2011 | Snell et al. | 52/586.1 |
| 2002/0121064 A1 | 9/2002 | Erwin | 52/586.1 |
| 2003/0123924 A1 | 7/2003 | Eberle, III | 403/12 |
| 2006/0147672 A1 | 7/2006 | Ruiz | 428/137 |
| 2006/0283122 A1 | 12/2006 | Burgess et al. | 52/480 |
| 2008/0279654 A1 | 11/2008 | Deschamps | 411/457 |

METHOD FOR MAKING A GANGABLE COMPOSITE CLIP FOR ATTACHING DECKING

1. CROSS REFERENCE TO RELATED APPLICATIONS

The instant non-provisional patent application is a Continuation-In-Part application of, and claims priority from, non-provisional patent application Ser. No. 12/592,495, filed on Nov. 25, 2009, for GANGABLE COMPOSITE CLIP FOR ATTACHING DECKING AND METHOD FOR MAKING, and which is incorporated in its entirety herein by reference thereto and which is still pending.

2. BACKGROUND OF THE INVENTION

A. Field of the Invention.

The embodiments of the present invention relate to a clip for attaching decking, and more particularly, the embodiments of the present invention relate to a gangable composite clip for attaching decking and method for making.

B. Description of the Prior Art.

Numerous innovations for deck clips have been provided in the prior art, which will be described below in chronological order to show potential advancement in the art, and which are incorporated herein by reference thereto. Even though these innovations may be suitable for the specific individual purposes to which they address, however, they differ from the embodiments of the present invention in that they do not teach a gangable composite clip for attaching decking and method for making.

(1) U.S. Pat. No. 3,845,860 to Ladouceur et al.

U.S. Pat. No. 3,845,860 issued to Ladouceur et al. on Nov. 5, 1974 in U.S. class 206 and subclass 338 teaches a fastener in a nut strip, which includes a pair of parallel retainer grooves adapted to receive a pair of retaining rods or wires that secure the fasteners in the pre-oriented strip form. The fastener is a pierce nut that includes a generally rectangular body portion having a piercing face and a pair of flanges at the opposite face, with one flange extending from each end of the nut. The rod retaining grooves are generally perpendicular to the opposite sides of the nut and are located between the flanges and the axis of the threaded aperture. The rods are inserted in the retaining grooves and the fastener, adjacent the grooves, and are deformed to retain the rods in the grooves. The nut strip and coil includes a plurality of aligned nuts, each having a pair of grooves on either side of the nut bore. The frangible rods or elements are retained in the nut grooves and bridge adjacent nuts. The end faces of the nuts, adjacent the grooves, are knurled, which spaces the nuts on the rods in close relation, securely retains the rods, and deforms the cylindrical rods into an oval shape. The knurling provides a plurality of portions projecting over and engaging the rods.

(2) U.S. Pat. No. 6,314,699 to West.

U.S. Pat. No. 6,314,699 issued to West on Nov. 13, 2001 in U.S. class 52 and subclass 489.1 teaches a deck system with a deck clip. The deck system includes deck boards in which receiving chambers are formed. The receiving chambers are formed in both opposing side edges of each deck board, and each chamber is defined in part by a lip edge. The deck boards are placed side-by-side during construction of a deck, closely spaced, so that the lip edges of adjacent deck boards define a narrow channel space therebetween in which a rotatable deck clip is placed. The clip has a first overhang member and an opposing second overhang member, and is thereby wider in a first horizontal dimension and shorter in a second, perpendicular horizontal dimension, and is rotatably attached to the deck joists by a screw or other fastening device. When the clip is rotated into a first position, its first and second overhang members extend into the receiving chambers of adjacent deck boards and engage the lip edges of each chamber to hold the deck boards securely in place upon the joists. Users may easily remove a deck board by simply rotating the clip ninety degrees to thereby move the overhang members of the clip into the channel space between the lip edges, and the deck boards are thereby released.

(3) U.S. Pat. No. 6,402,415 B1 to Eberle, III

U.S. Pat. No. 6,402,415 B1 issued to Eberle, III on Jun. 11, 2002 in U.S. class 403 and subclass 231 teaches an anchoring biscuit device for joining three boards. It includes a first substantially flat horizontal top element having a generally biscuit-shaped configuration, at least one substantially vertical support member attached to the underside of the top element and extending downwardly therefrom for a predetermined length for joinder of two adjacent boards that have been pre-cut with biscuit receiving slots, and an attachment orifice located at least on the top element for attachment of the anchoring biscuit device to a support board for anchoring and support of the two adjacent boards. In one preferred embodiment, a top bevel is included at the orifice to permit angled screwing at positions other than vertical positions. In other embodiments, the screw orifice has an oval or elongated shape to likewise enable screwing at angles other than vertical. In yet another preferred embodiment, the orifice is both beveled and elongated.

(4) United States Patent Application Publication Number US 2002/0121064 A1 to Erwin.

United States Patent Application Publication Number US 2002/0121064 A1 published to Erwin on Sep. 5, 2002 in U.S. class 52 and subclass 586.1 teaches a plank having a wood core with a groove formed in each of its sides and a protective cladding formed on its top surface. The wood core is formed by bonding a plurality of wood strips or chips together. The cladding is provided by a sheet of a material selected from the group consisting of plastic, polyvinyl chloride (PVC), acrylic, polycarbonate, and composites thereof that is bonded to the top surface or by two or another number of sheets of a material selected from the group consisting of polyester, phenol, epoxy, and composites thereof that are sprayed or rolled onto the top surface. T-shaped connector clips are provided with the arms receivable in the grooves of the plank for securing adjacent planks together.

(5) U.S. Pat. No. 6,470,641 B1 to Faure.

U.S. Pat. No. 6,470,641 B1 issued to Faure on Oct. 29, 2002 in U.S. class 52 and subclass 480 teaches an assembly device without visible screws for assembly of two parallel wooden slats, which includes an intercalated fixing element engaged in two positioning grooves arranged side-by-side in the side faces. The fixing element includes a metal slide having a base-part equipped with an oblong aperture extending longitudinally in the central-part for the screw to pass through, two securing wings oriented in opposite directions from one another and designed to press in the grooves when the screw is tightened, and a screw head whose external dimension is greater than the visible second gap and which is arranged above the grooves between the upper edges of the two wooden slats.

(6) United States Patent Application Publication Number US 2003/0123924 A1 to Eberle, III.

United States Patent Application Publication Number US 2003/0123924 A1 published to Eberle, III on Jul. 3, 2003 in U.S. class 403 and subclass 12 teaches an anchoring device for joining three boards. It includes a substantially flat horizontal top element having a top view configuration that includes two sides and has a first predetermined width as measured side-to-side at its maximum width between the two sides. There is at least one substantially vertical support member attached to the underside of the top element along an imaginary center line and extending downwardly from the top element for a predetermined length, which has two sides and a second predetermined width as measured side-to-side at its maximum width. There is a substantially flat horizontal bottom element that includes two sides and has a third predetermined width as measured side-to-side at its maximum width. The first predetermined width is greater than both the second predetermined width and the third predetermined width, and the third predetermined width is greater than the second predetermined width. A decking system utilizes the anchoring device.

(7) U.S. Pat. No. 6,711,864 B2 to Erwin.

U.S. Pat. No. 6,711,864 B2 issued to Erwin on Mar. 30, 2004 in U.S. class 52 and subclass 582.1 teaches a plank having a wood core with a groove formed in each of its sides and a protective cladding formed on its top surface. The wood core is formed by bonding a plurality of wood strips or chips together. The cladding is provided by a sheet of a material selected from the group consisting of plastic, polyvinyl chloride (PVC), acrylic, polycarbonate, and composites thereof that is bonded to the top surface or by two or another number of sheets of a material selected from the group consisting of polyester, phenol, epoxy, and composites thereof that are sprayed or rolled onto the top surface. T-shaped connector clips are provided with the arms receivable in the grooves of the plank for securing adjacent planks together.

(8) U.S. Pat. No. 6,851,884 B2 to Eberle.

U.S. Pat. No. 6,851,884 B2 issued to Eberle on Feb. 8, 2005 in U.S. class 403 and subclass 231 teaches an anchoring biscuit device for joining three boards. It includes, a first substantially flat horizontal top element having a generally biscuit-shaped configuration with opposite sidewalls, at least one of said sidewalls having a flat edge and at least a portion of the sidewalls being non-parallel with respect to one another, at least one substantially vertical support member attached to the underside of the top element and extending downwardly therefrom for a predetermined length for joinder of two adjacent boards that have been pre-cut with biscuit receiving slots, and an attachment orifice located at least on the top element for attachment of the anchoring biscuit device to a support board for anchoring and support of the two adjacent boards. In one preferred embodiment, a top bevel is included at the orifice to permit angled screwing at positions other than vertical.

(9) U.S. Pat. No. 6,871,467 B2 to Hafner.

United States Patent Number U.S. Pat. No. 6,871,467 B2 issued to Hafner on Mar. 29, 2005 in U.S. class 52 and subclass 586.1 teaches a decking system and clip apparatus used therein. The clip apparatus typically includes a top portion and a pair of lateral projections extending from opposite sides of the top portion. Each lateral projection is configured to contact a respective decking member, thereby maintaining a predefined distance between the decking members. The clip apparatus further typically includes a pair of spaced-apart downward projections extending downward from the top portion. The downward projections are separated by a void sized to receive the joist.

(10) U.S. Pat. No. 7,052,200 B2 to Harris.

U.S. Pat. No. 7,052,200 B2 issued to Harris on May 30, 2006 in U.S. class 403 and subclass 231 teaches a fastener for securing deck boards to a support structure without the need for driving screws or nails through the deck boards. The fastener includes two horizontal flanges that fit into slots cut into the sides of adjacent deck boards, a center hole for securing the fastener to the support structure, and deformable resilient elements that bridge a gap between adjacent deck boards during fastening, yet compress inward when the boards swell and expand.

(11) U.S. Pat. No. 7,409,803 B2 to Grohman.

U.S. Pat. No. 7,409,803 B2 issued to Grohman on Aug. 12, 2008 in U.S. class 52 and subclass 489.1 teaches a deck system employing a plurality of substantially hidden fasteners to couple floor boards of the deck to joists. Each hidden fastener is rigidly coupled to a respective joist and positioned between a pair of adjacent floorboards. Each fastener forms a mating relationship with specially configured sides of the boards to thereby rigidly couple the boards to the joists.

It is apparent that numerous innovations for deck clips have been provided in the prior art, which are adapted to be used. Furthermore, even though these innovations may be suitable for the specific individual purposes to which they address, however, they would not be suitable for the purposes of the present invention as heretofore described, namely, a gangable composite clip for attaching decking and method for making.

3. SUMMARY OF THE INVENTION

Thus, it is an object of the embodiments of the present invention to provide a gangable composite clip for attaching decking and method for making, which avoids the disadvantages of the prior art.

Briefly stated, another object of the embodiments of the present invention is to provide a gangable composite clip for attaching decking. The clip includes a bottom and a top. The bottom is made of a first material. The top is made of a second material. The first material of the bottom is different than the second material of the top. The first material of the bottom engages in the second material of the top during manufacturing so as to attach the bottom to the top and form the gangable composite clip without a need for any other means to attach the bottom to the top.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying drawings.

4. BRIEF DESCRIPTION OF THE DRAWINGS

The figures of the drawings are briefly described as follows.

5. LIST OF REFERENCE NUMERALS UTILIZED IN THE DRAWING

A. General.
10 gangable composite clip of embodiments of present invention for attaching decking 12
12 decking
B. Configuration of gangable composite clip 10.
14 bottom
16 top
18 upright portion
20 transverse portion
21 portion of transverse portion 20
22 remaining portion of transverse portion 20
24 one axis of transverse portion 20
26 other axis of transverse portion 20
27 mounting through bore
28 countersink of mounting through bore 26 for setting head 30 of mounting screw 32 flush with top 16
30 head of mounting screw 32
32 mounting screw
34 plurality of bonding through bores in top 16
36 lower portion of each bonding through bore of plurality of bonding through bores 34 in top 16
38 upper portion of each bonding through bore of plurality of bonding through bores 34 in top 16
C. Ganging gangable composite clip 10.
40 connectors for facilitating installation of clip 10
42 handle for further facilitating installation of clip 10
D. Method of 50 of making gangable composite clip 10.
50 method
52 metal plate
54 stamping machine
56 injection molding machine
58 plastic material or equivalent
60 one strip
62 pneumatic nailer
64 pre-installed screws

6. DETAILED DESCRIPTION OF THE PREFERRED EMBODIMENTS

A. General.

Figure 1:
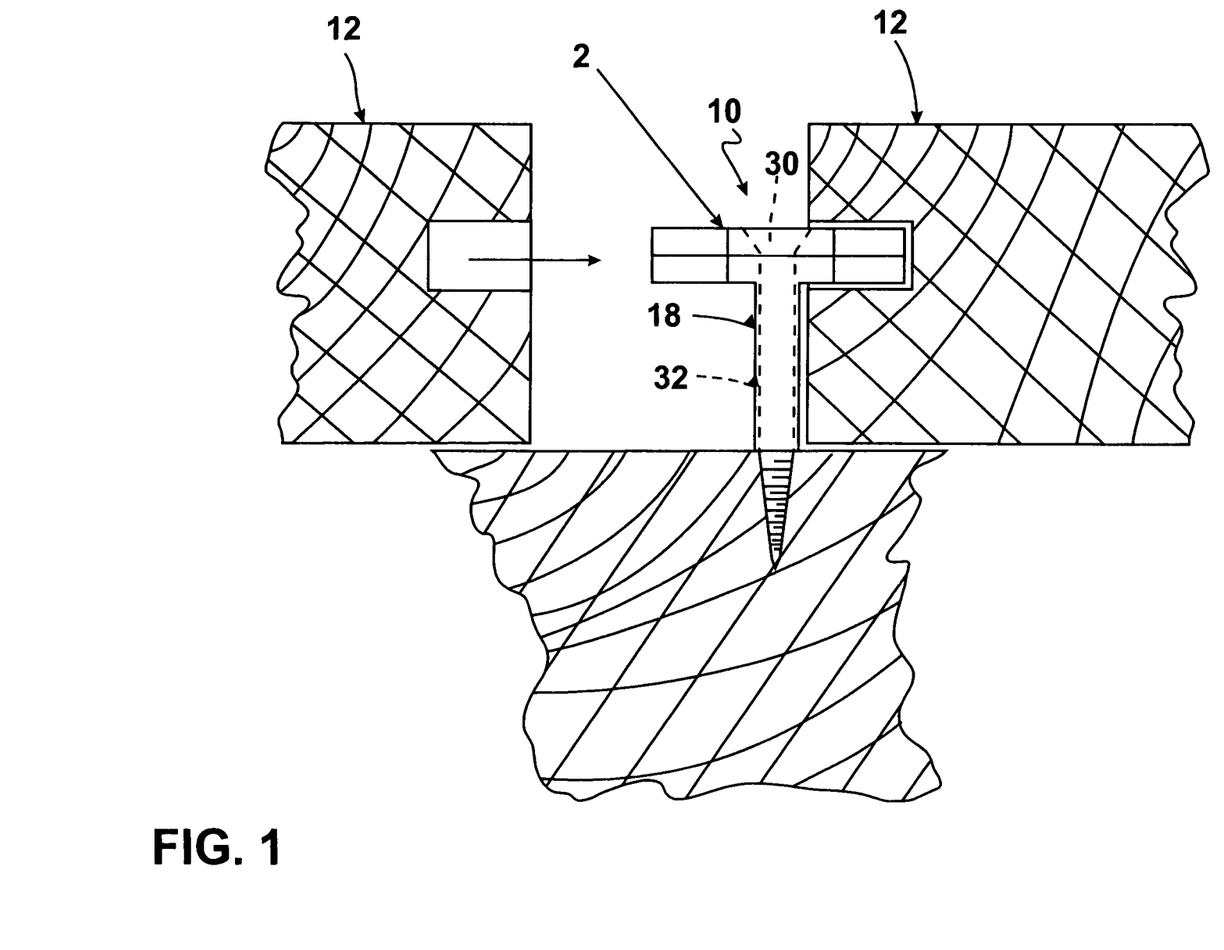
FIG. 1 is a diagrammatic cross sectional view of the gangable composite clip of the embodiments of the present invention attaching decking.

Referring now to the drawings, and particularly top FIG. 1, which is a diagrammatic cross sectional view of the gangable composite clip of the embodiments of the present invention attaching decking, the gangable composite clip of the embodiments of the present invention is shown generally at 10 for attaching decking 12.

B. The configuration of the gangable composite clip 10.

Figure 2:
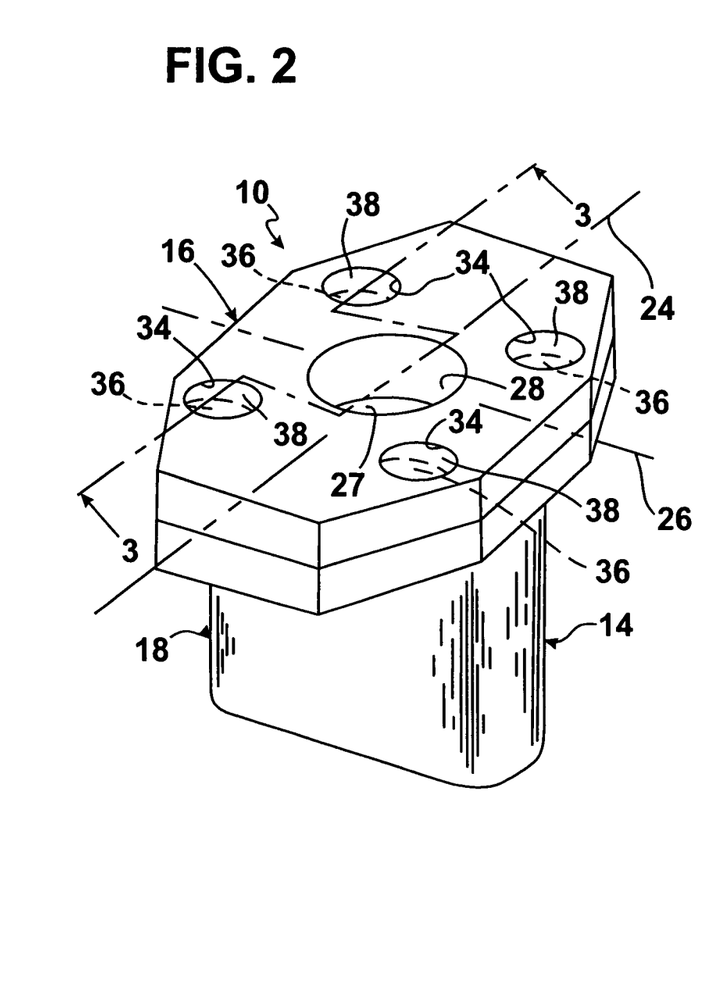
FIG. 2 is an enlarged diagrammatic perspective view of the gangable composite clip of the embodiments of the present invention identified by ARROW 2 in FIG. 1.
Figure 3:
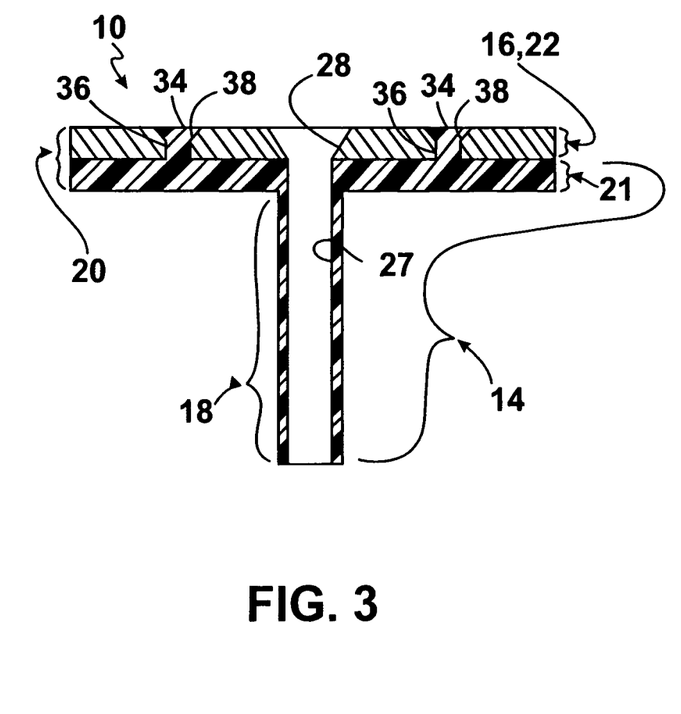
FIG. 3 is a diagrammatic cross sectional view taken along LINE 3-3 in FIG. 2.

The overall configuration of the gangable composite clip 10 can best be seen in FIGS. 2 and 3, which are, respectively, an enlarged diagrammatic perspective view of the gangable composite clip of the embodiments of the present invention identified by ARROW 2 in FIG. 1, and a diagrammatic cross sectional view taken along LINE 3-3 in FIG. 2, and as such, will be discussed with reference thereto.

The gangable composite clip 10 comprises a bottom 14 and a top 16. The bottom 14 is made of a first material. The top 16 is made of a second material. The first material of the bottom 14 is different than the second material of the top 16. The first material of the bottom 14 engages in the second material of the top 16 during manufacturing so as to attach the bottom 14 to the top 16 and form the gangable composite clip 10 without a need for any other means to attach the bottom 14 to the top 16.

The first material of the bottom 14 is, preferably, plastic, but is not limited to that, while the second material of the top 16 is, preferably, exterior grade metal, but is not limited to that.

The gangable composite clip 10 is generally T-shaped in side view, and as such, has an upright portion 18 and a transverse portion 20. The upright portion 18 and a portion 21 of the transverse portion 20 form the bottom 14, and as such, gives the bottom 14 a generally T-shape in side view, while a remaining portion 22 of the transverse portion 20 forms the top 16. The upright portion 18 is for providing proper and uniform spacing between adjacent deckings 12 (FIG. 1).

The transverse portion 20 is generally octagon-shaped in plan view, but has one axis 24 thereof longer than the other axis 26 thereof so as to be asymmetrical.

The gangable composite clip 10 has a mounting through bore 27. The mounting through bore 27 passes centrally, continuously, and vertically through both the bottom 14 and the top 16.

The mounting through bore 26 has a countersink 28. The countersink 28 of the mounting through bore 26 is disposed through the top 16 for setting the head 30 of a mounting screw 32 flush with the top 16 (FIG. 1).

The top 16 has a plurality of bonding through bores 34. The plurality of bonding through bores 34 in the top 16 pass vertically and continuously therethrough, are disposed outboard of the mounting through bore 26, are, preferably, two or four in number, but is not limited to that, and may be of varying shape.

Each bonding through bore 34 in the top 16 has a lower portion 36 and an upper portion 38. The upper portion 38 of each bonding through bore 34 in the top 16 extends upwardly from, and is wider than, the lower portion 36 of an associated bonding through bore 34 in the top 16 so as to allow the first material of the bottom 14 to flow through the lower portion 36 of the associated bonding through bore 34 in the top 16 and captively engage in the upper portion 38 of each bonding through bore 34 in the top 16 during manufacturing so as to attach the bottom 14 to the top 16 and form the gangable composite clip 10 without a need for any other means to attach the bottom 14 to the top 16.

C. Ganging the gangable composite clip 10.

Figure 4:
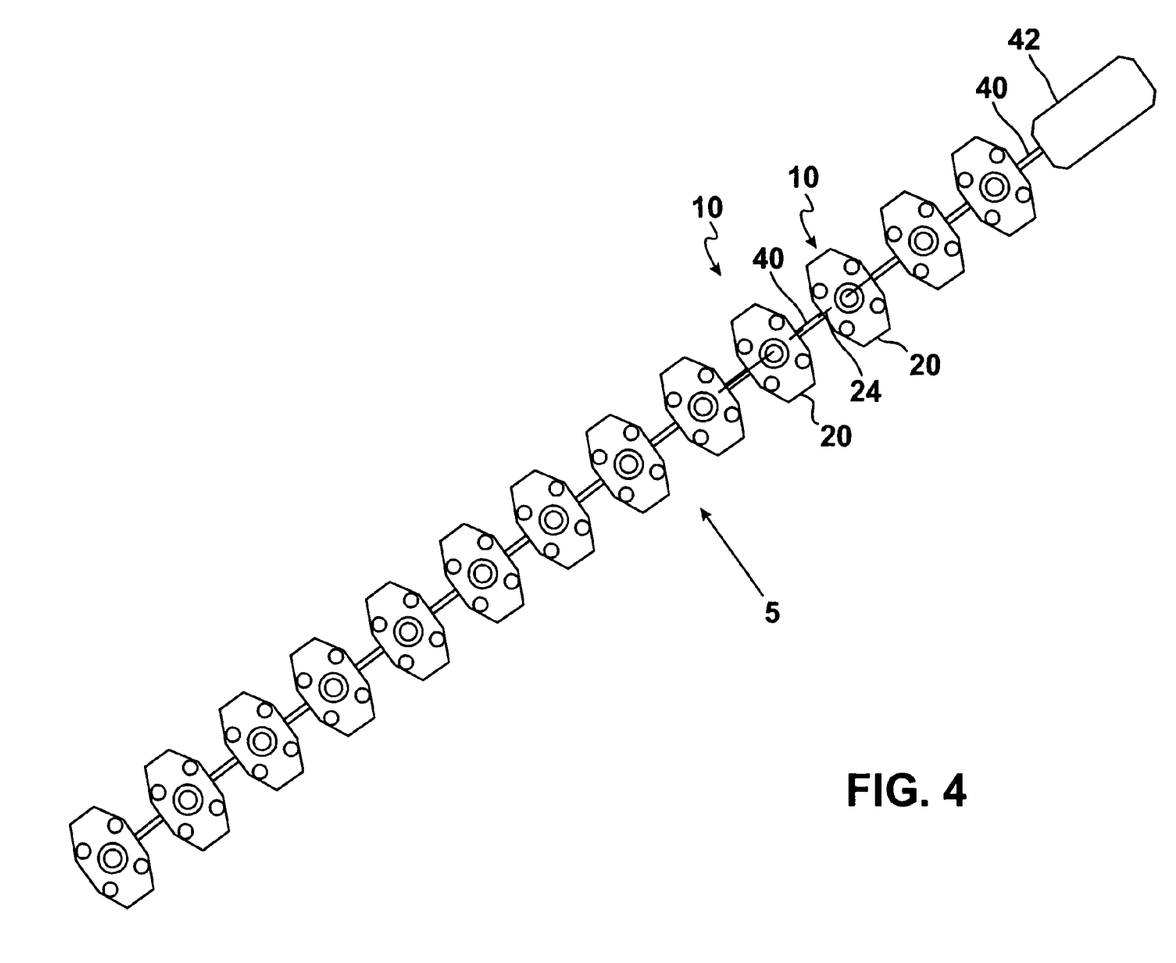
FIG. 4 is a diagrammatic top plan view illustrating multiple gangable composite clips of the embodiments of the present invention manufactured ganged together for facilitating use and including a removable handle for further facilitating use.
Figure 5:
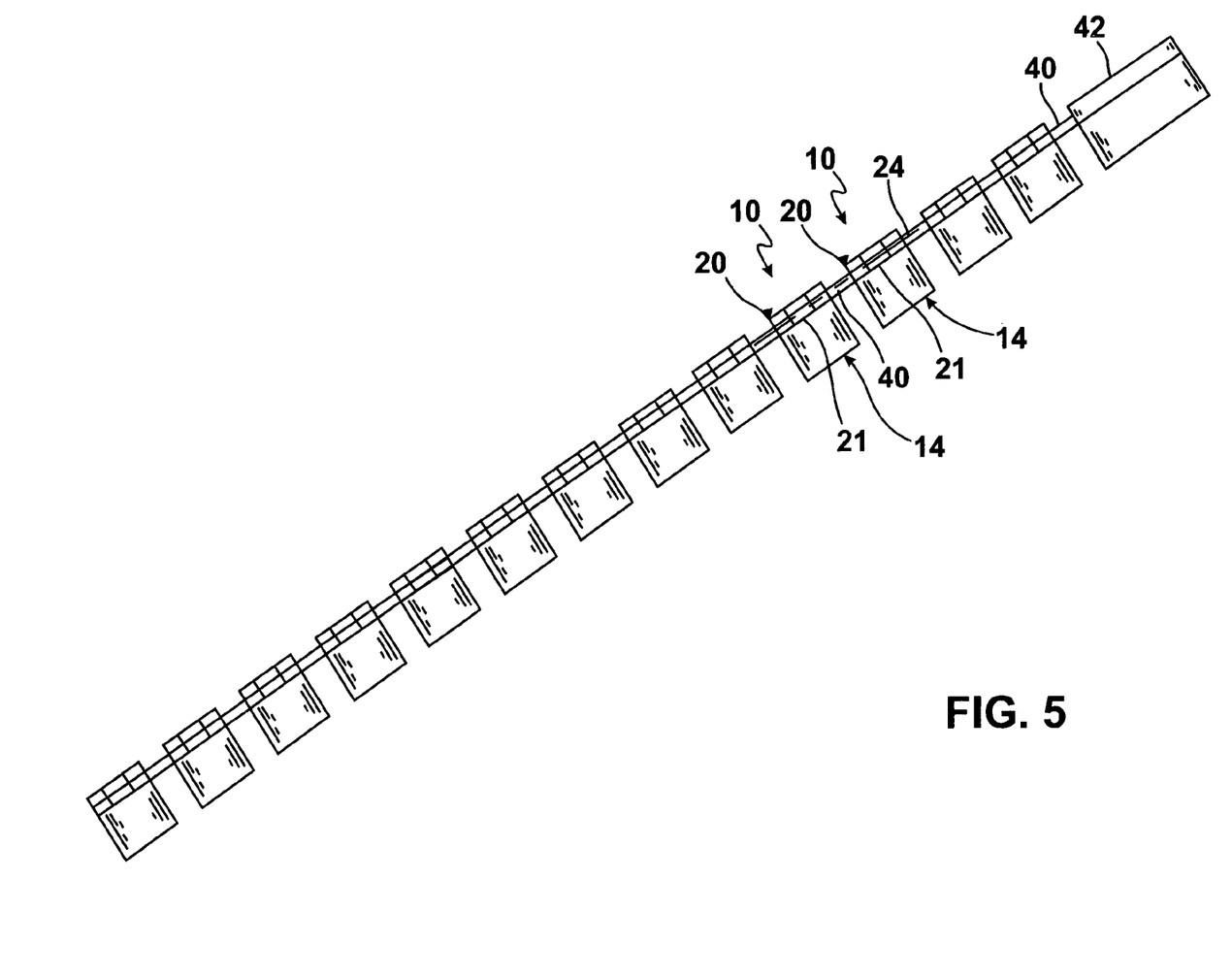
FIG. 5 is a diagrammatic side elevational view taken generally in the direction of ARROW 5 in FIG. 4.

Ganging the gangable composite clip 10 can best be seen in FIGS. 4 and 5, which are, respectively, a diagrammatic top plan view illustrating multiple gangable composite clips of the embodiments of the present invention manufactured ganged together for facilitating use and including a removable handle for further facilitating use, and a diagrammatic side elevational view taken generally in the direction of ARROW 5 in FIG. 4, and as such, will be discussed with reference thereto.

The gangable composite clips 10 are ganged together in a side-by-side, or end-to-end, and spaced-apart relationship along the other axis 26 thereof by connectors 40. The connectors 40 are thin, elongated, of the first material, readily breakable, and formed connecting adjacent portions 21 of the transverse portion 20 of each clip 10 to each other during manufacturing for facilitating installation of the clip 10.

The gangable composite clips 10 further include a handle 42. The handle 42 extends from a connector 40 extending from a first ganged composite clip 10 for further facilitating installation of the clip 10, and has a shape similar to of the clip 10.

D. Method 50 of making the gangable composite clip 10.

The method 50 of making the gangable composite clip 10 can best be seen in FIGS. 6A-6D, and as such, will be discussed with reference thereto.

Figure 6:
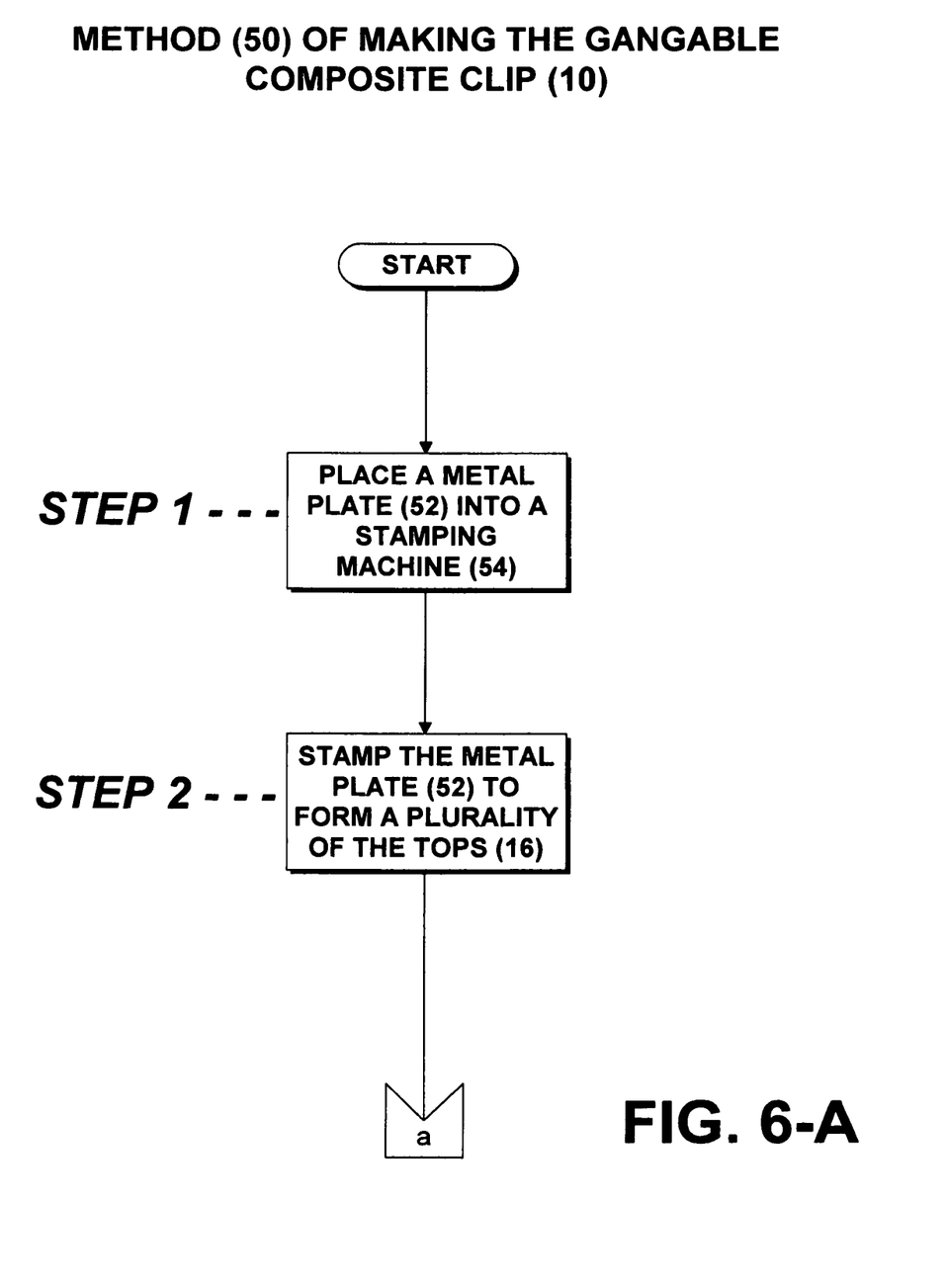
FIGS. 6A-6D are a flowchart of the method of making the gangable composite clip.

The method 50 of making the gangable composite clip 10 comprises the steps of:

STEP 1: Place a metal plate 52 into a stamping machine 54;

STEP 2: Stamp the metal plate 52 to form a plurality of the tops 16 of the chips 10;

STEP 3: Stamp the plurality of bonding through bores 34 into each of the plurality of tops 16, wherein each bonding through bore 34 has a lower portion 36 communicating with an upper portion 38, and wherein the upper portion 38 of each bonding through bore 34 in the tops 16 is wider than the lower portion 36 of an associated bonding through bore 34 in the tops 16;

STEP 4: Insert the plurality of the tops 16 into an injection molding machine 56;

STEP 5: Inject plastic material or equivalent 58 into the injection molding machine 56 to form a plurality of the bottoms 14 of the chips 10;

STEP 6: Cause the plastic material or equivalent 58 to flow into, and engage, the plurality of bonding through bores 34 in the plurality of tops 16, respectively;

STEP 7: Capture the plastic material or equivalent 58 into a plurality of the upper portions 38 of the plurality of bonding through bores 34, respectively, so as to allow the plastic material or equivalent 58 to flow through the lower portion 36 of an associated bonding through bore 34 in the tops 16 and captively engage in the upper portion 38 of the associated bonding through bore 34 in the tops 16 so as to permanently attach the tops 16 in direct intimate contact to the bottom 14, respectively, and form gangable composite clips 10 without a need for any other means to attach the bottoms 14 to the tops 16, respectively; and STEP 8: Form a string of individual clips 10 as one strip 60 that is ready to be cut during installation with a pneumatic nailer 62 or by hand when using pre-installed screws 64.

E. Impressions.

It will be understood that each of the elements described above or two or more together may also find a useful application in other types of constructions differing from the types described above.

While the embodiments of the present invention have been illustrated and described as embodied in a gangable composite clip for attaching decking and method for making, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features from the standpoint of prior art fairly constitute characteristics of the generic or specific aspects of the embodiments of the present invention.

The invention claimed is:

1. A method of making a gangable composite clip, comprising the steps of:
   a) placing a metal plate into a stamping machine;
   b) stamping the metal plate to form a plurality of top of the clips;
   c) stamping a plurality of bonding through bores into each of the plurality of tops, wherein each bonding through bore has a lower portion communicating with an upper portion, and wherein the upper portion of each bonding through bore in the tops is wider than the lower portion of an associated bonding through bore in the tops;
   d) inserting the plurality of the tops into an injection molding machine;
   e) injecting plastic material or equivalent into the injection molding machine to form a plurality of bottoms of the clips;
   f) causing the plastic material or equivalent to flow into, and engage, the plurality of bonding through bores in the plurality of tops, respectively;
   g) capturing the plastic material or equivalent into a plurality of the upper portions of the plurality of bonding through bores, respectively, so as to allow the plastic material or equivalent to flow through the lower portion of an associated bonding through bore in the tops and captively engage in the upper portion of the associated bonding through bore in the tops so as to permanently attach the tops in direct intimate contact to the bottoms, respectively, and form gangable composite clips without a need for any other means to attach the bottoms to the tops, respectively; and
   h) forming a string of individual clips as one strip that is ready to be cut during installation with a pneumatic nailer or by hand when using pre-installed screws.

2. The method of claim 1, wherein each gangable composite clip has a mounting through bore.

3. The method of claim 2, wherein each mounting through bore passes centrally through both the bottoms and associated tops;
   wherein the mounting through bore passes continuously through both the bottoms and the associated tops; and
   wherein the mounting through bore passes vertically through both the bottoms and the associated tops.

4. The method of claim 2, wherein each mounting through bore has a countersink.

5. The method of claim 4, wherein the countersink of each mounting through bore is disposed through an associated top for setting the head of a mounting screw flush with the associated top.

6. The method of claim 2, wherein the plurality of bonding through bores in the tops pass continuously therethrough; and
   wherein the plurality of bonding through bores in the tops are disposed outboard of an associated mounting through bore.

7. The method of claim 1, wherein the upper portion of each bonding through bore in each top extends upwardly from the lower portion of an associated bonding through bore in an associated top.

8. The method of claim 1, wherein each top is exterior grade metal.

9. The method of claim 1, wherein each gangable composite clip is generally T-shaped in side view, and as such, has:
   a) an upright portion; and
   b) a transverse portion.

10. The method of claim 9, wherein the upright portion and a portion of the transverse portion form each bottom, and as such, gives each bottom a generally T-shape in side view, while a remaining portion of the transverse portion forms an associated top.

11. The method of claim 9, wherein each transverse portion is generally octagon-shaped in plan view.

12. The method of claim 9, wherein one axis of each transverse portion is longer than the other axis of an associated transverse portion so as to be asymmetrical.

13. The method of claim 12, wherein each gangable composite clip is ganged to an adjacent gangable clip in a side-by-side, or end-to-end, and spaced-apart relationship along the other axis of an associated transverse portion by connectors.

14. The method of claim 13, wherein the connectors are thin;
   wherein the connectors are elongated;
   wherein the connectors are of the plastic material or equivalent;
   wherein the connectors are readily breakable; and
   wherein the connectors are formed connecting adjacent portions of the transverse portion of each clip to each other for facilitating installation of the clips.

15. The method of claim 13, further comprising a handle.

16. The method of claim 15, wherein the handle extends from a connector extending from a first ganged composite clip for facilitating installation of the clips.

17. The method of claim 15, wherein the handle has a shape similar to of each clip.

\* \* \* \* \*